United States Patent [19]

Nelson

[11] 4,406,138
[45] Sep. 27, 1983

[54] LOAD MANAGEMENT CONTROL AIR CONDITIONING SYSTEM

[75] Inventor: Lorne W. Nelson, South Bloomington, Minn.

[73] Assignee: Honeywell Inc., Minneapolis, Minn.

[21] Appl. No.: 322,494

[22] Filed: Nov. 18, 1981

[51] Int. Cl.³ .............................................. F28D 5/00
[52] U.S. Cl. ...................................... 62/305; 62/119; 62/185
[58] Field of Search ................ 62/304, 305, 310, 117, 62/119, 185; 126/433; 165/62; 261/151

[56] References Cited

U.S. PATENT DOCUMENTS

| | | | |
|---|---|---|---|
| 3,747,362 | 7/1973 | Mercer | 62/310 |
| 4,102,392 | 7/1978 | Schneider | 62/310 |
| 4,107,942 | 8/1978 | Fairman | 62/310 |
| 4,201,062 | 5/1980 | Martinez, Jr. | 62/310 |
| 4,259,268 | 3/1981 | Di Ross | 62/310 |

*Primary Examiner*—Albert J. Makay
*Assistant Examiner*—Henry Bennett

*Attorney, Agent, or Firm*—Lockwood D. Burton; Mitchell J. Halista

[57] ABSTRACT

An air conditioning system for providing an air cooling operation during a load phase management shutdown of the air conditioning compressor utilizes a thermally insulated cold water tank for storing chilled water. The water is cooled by a free cooling effect using wet bulb temperature drop of a refrigerant circulating between a secondary coil in a condenser section of the air conditioning system and a heat exchanger in the chilled water tank located below the condenser. The secondary coil in the condenser is cooled by a waterspray which can advantageously be derived from the condensate obtained from the evaporator section during a compressor operation phase of the air conditioning system. The chilled water is supplied to a chilled water coil in an evaporator section to cool the air flow in a chilled water cooling operation when the air conditioning compressor is inoperative during the load management phase of the peak hour of the air conditioning system.

10 Claims, 1 Drawing Figure

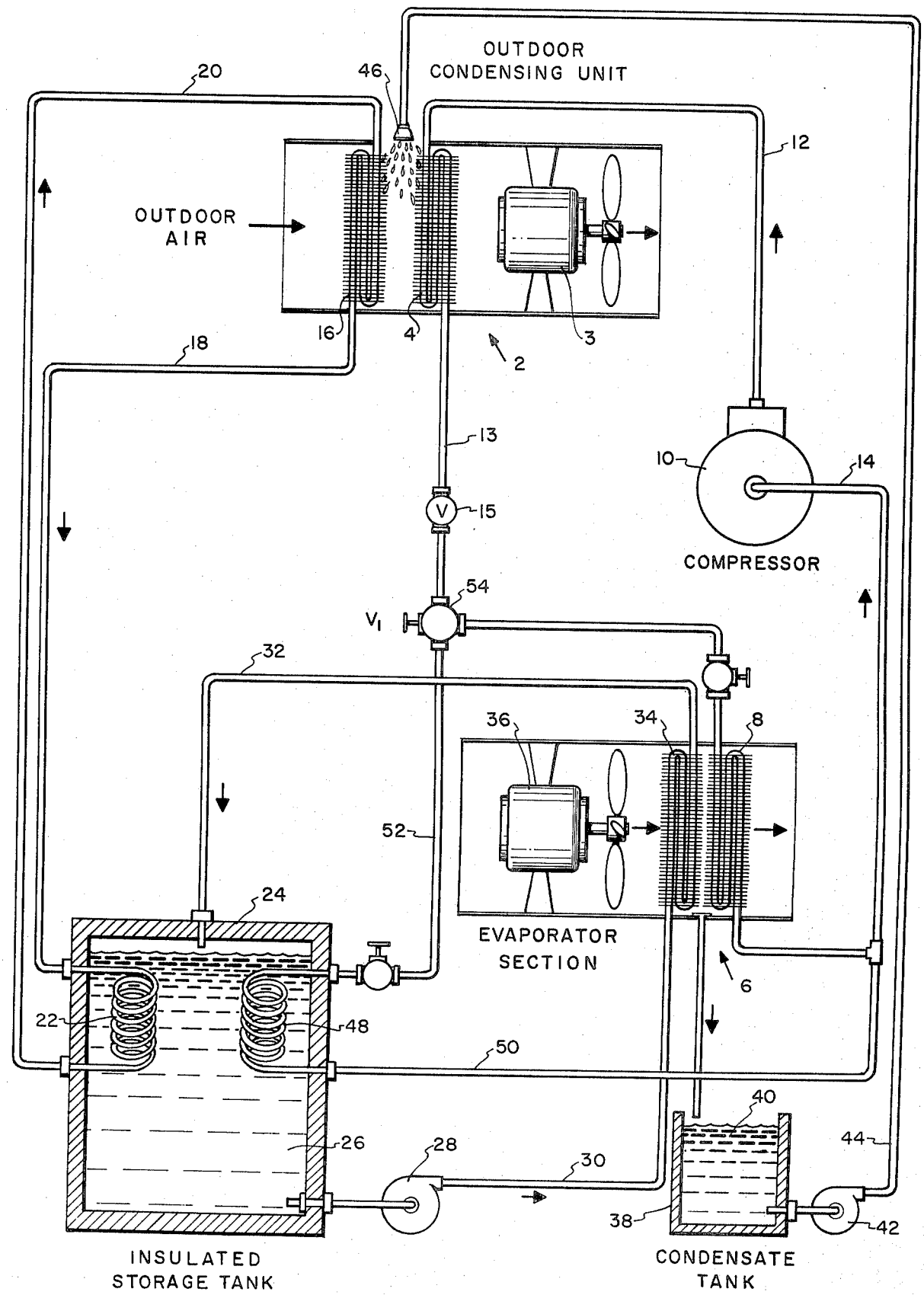

LOAD MANAGEMENT CONTROL AIR CONDITIONING SYSTEM

BACKGROUND OF THE INVENTION

1. Field Of The Invention

The present invention relates to air conditioners. More specifically, the present invention is directed to an air conditioning system for providing air cooling during a load management shutdown of the air conditioning compressor.

2. Description Of The Prior Art

As an energy conservation measure and to reduce cooling costs of air conditioning systems, an increased emphasis is currently being placed on reducing electric power consumed by air conditioning systems during peak demand conditions for electric power in high electric power demand areas. This had led to load management techniques such as the use of demand rates and time-of-day rates for users to adjust electrical power rates to reflect energy costs. In air conditioning applications, such limitations on air conditioning and electrical power usage has promoted the use of storage systems for supplying cooling and off-peak cooling. During the off-peak cooling, the air conditioning compressor is de-energized during peak demand hours which limits the amount of cooling available during the peak hours. Accordingly, it would be desirable to have an air conditioning system that could continue to provide cooling during load management intervals when the air conditioning compressor is disconnected while minimizing the additional structure necessary to effect such a peak hour cooling operation and the electrical power needed to provide such a substitute cooling.

SUMMARY OF THE INVENTION

An object of the present invention is to provide an improved air conditioning system for providing cooling during an inoperative state of the compressor.

In accomplishing this and other objects, there has been provided, in accordance with the present invention, an air conditioning system having a chilled water cooling system using a secondary condensing coil located in a condenser section of the air conditioning system and supplied with a water vapor to cool the refrigerant in the secondary condensing coil to a wet bulb temperature to liquify a refrigerant in a refrigerant line connecting the condensing coil to a heat exchanger immersed in water in a chilled water storage tank and located at a lower elevation than the condensing coil. A return line is used to return the refrigerant to the secondary condenser coil after vaporization in the heat exchanger. The chilled water is used in a secondary evaporator coil located in an evaporator section of the air conditioning system to provide cooling of the air passing through the evaporator section during operation of an evaporator fan.

BRIEF DESCRIPTION OF THE DRAWING

A better understanding of the present invention may be had when the following detailed description is read in connection with the accompanying drawing, in which the single FIGURE is a schematic illustration of an air conditioning system embodying an example of the present invention.

DESCRIPTION OF THE PREFERRED EMBODIMENT

Detailed Description

Referrring to the single FIGURE drawing in more detail, there is shown an air conditioning system embodying an example of the present invention in an air conditioning system having a condensing unit 2 with a fan 3 used to provide air movement through a conventional condenser coil 4 in the condensing unit 2. Associated with the condensing unit 4 is an evaporator section 6 which may be remotely located from the condensing unit 2, e.g., the condensing unit 2 may be located outdoors while the evaporator section 6 is located within an enclosure to be cooled. The evaporator section 6 includes a conventional evaporator coil 8 connected to the condensing coil 4 through a compressor 10 and connecting lines 12, 13, 14 and expansion valve 15 whereby the evaporator coil 8 is in series with the compressor 10 and the condensing coil 4.

A second condenser coil 16 is located within the condensing unit 2 and is connected by a pair of refrigerant lines 18, 20 in series with a heat exchanger coil 22 having lower elevation than the second condenser coil 16. The first refrigerant line 18 is used to conduct a liquid refrigerant from one end of the second condensing coil 16 to the heat exchanger 22 while the second refrigerant line 20 is used to conduct a vaporized refrigerant from the heat exchanger 22 to the other end of the condensing coil 16. The heat exchanger 22 is located within an insulated storage tank 24 having a chilled liquid 26, e.g., water, stored therein. A pump 28 is arranged to pump the liquid from the storage tank 24 through a liquid pipeline 30 to a second evaporator coil 34 located in the evaporator section 6. A return line 32 is arranged to connect an outlet of the second evaporator coil 6 back to the storage tank 24 to return the liquid to the tank 24. The evaporator section 6 includes an evaporator fan 36 for directing a stream of air from the enclosure to be cooled over the first and second evaporator coils 8, 34.

A condensate tank 38 is arranged to collect the normal condensate water 40 from the evaporator section 6 while a pump 42 provides a means for directing the water 40 through a conduit 44 to a water spray 46 located in the condensing unit 2. A second heat exchanger 48 is located in the storage tank 24 and is connected at one end to a first refrigerant line 50 and at the other end to a second refrigerant line 52. The first refrigerant line 50 is connected to a T-connection 53 with the refrigerant line 14 while the second refrigerant line 52 is connected through a selectively operable valve 54 to the refrigerant line 13.

MODE OF OPERATION

The compressor 10 is arranged to operate conventionally during non-peak hours in combination with the condensing coil 4, the evaporator coil 8 and the expansion valve 15 to provide an air conditioning effect whereby cooled air is supplied to an enclosure from the evaporator unit 6 by the fan 36. During a peak hour load management control of the air conditioning system, the air conditioning compressor 10 is turned for power demand control. During this time, the chilled water 26 from the storage tank 24 is pumped by the pump 28 through the coil 34 in the evaporator unit 6. The cooling effect provided by the chilled water passing through the coil 34 is arranged to cool the air supplied by the evaporator fan 36 to provide a cooling of the enclosure connected to the evaporator unit 6. The chilled water 26 in the tank 24 is cooled by the operation of the system during times when the outdoor air wet bulb temperature is low, e.g., nighttime. During this time, the condenser fan 3 continues to move air over the second condensing coil 4 which is supplied with a water spray from a spray unit 46 connected to the condensate tank 38. The water spray on the coil 16 is effective to lower the coil temperature to approach the wet bulb temperature. The low coil temperature condenses the refrigerant in the second condenser 16, and the condensed refrigerant flows by gravity to the heat exchanger 22 in the storage tank 24. The liquid refrigerant is heated by the water 26 in a heat exchange process in the storage tank 24 and is reconverted to a gas to cool the water 26. The return line 20 is, subsequently, effective to provide a return path for the refrigerant to the second condensing coil 16. Thus, a "free cooling" is achieved by the depression of the wet bulb temperature of the cold water storage temperature in the storage tank 24. The condensate in the tank 38 is preferably used for the spray 46 to avoid mineral deposit problems. Finally, the valve 54 is provided to effect additional cooling of the water 26 in the tank 24 by means of the second heat exchanger coil 48. This may be achieved during times of minimum demand on the air conditioning system whereby the second coil 48 is operated in place of the first evaporator coil 8 in the evaporator unit during an operation of the compressor 10. In order to clarify the presentation of the air conditioning system in the drawing, the electrical connections to the compressor 10, the pumps 28 and 42 and any thermostats in the enclosure to be cooled have been omitted. Additionally, the air conditioning system would have a central control for controlling the electrical power supplied to the compressor 10 and the pumps 28 and 42 in accordance with the load management control requirements as well as any thermostats and/or temperature sensors that might be used to sense enclosure temperature, outdoor temperature, chilled water temperature, etc. Additionally, the valve 54 may be an electrically operated device which would also be selectively operated by the central control. The details of such a control unit are well-known in the art and the details thereof are believed to be unnecessary for a complete understanding of the present invention.

Additionally, it may be seen that there has been provided in accordance with the present invention, an improved air conditioning system for providing cooling during an interruption in the operation of the air conditioner compressor.

The embodiments of the invention in which an exclusive property or privilege is claimed are defined as follows:

1. An air-conditioning system comprising a condenser section including a first condenser coil and a condenser fan,
   an evaporator section including a first evaporator coil and an evaporator fan,
   compressor means interconnecting said first condenser coil to said first evaporator coil
   a second condenser section including a second condenser coil arrange in a path of air flow from said condenser fan,
   a fluid storage tank located below said second condenser coil,
   a heat exchanger in said tank,
   refrigerant lines interconnecting said heat exchanger in series with said second condenser coil,
   a refrigerant medium in said refrigerant lines having a boiling point at a wet bulb temperature of the ambient air surrounding said second condenser coil,
   a water spray means for directing a water spray on said second condenser coil to cool said second condenser coil to said wet bulb temperature,
   a second evaporator coil in said evaporator section arranged in a path of air from said evaporator fan and
   means for selectively propelling a fluid from said storage tank through said second evaporator coil.

2. An air conditioning system as set forth in claim 1 wherein said fluid is water.

3. An air conditioning system as set forth in claim 2 wherein said means for selectively propelling includes a pump for pumping said water.

4. An air conditioning system as set forth in claim 3 wherein said storage tank is a thermally insulated tank.

5. An air conditioning system as set forth in claim 1 and further including a second heat exchanger in said tank and valve means for selectively substituting said second heat exchanger for said first evaporator coil.

6. An air conditioning system as set forth in claim 1 and further including a condensate storate tank in said evaporator section and means for selectively supplying condensate water in said condensate storage tank to said water spray means.

7. An air conditioning system as set forth in claim 1 wherein said fluid storage tank has a lower elevation than said second condenser coil whereby said refrigerant medium in liquid form is impelled by gravity to flow from said second condenser coil to said heat exchanger.

8. An air conditioning system as set forth in claim 7 wherein said fluid in said storage tank is water.

9. An air conditioning system as set forth in claim 1 wherein said water spray means and means for selectively propelling are operated during an interruption in the operation of said compressor means.

10. An air conditioning system as set forth in claim 6 wherein said means for supplying includes a water pump for pumping said condensate water to said water spray means.

* * * * *